United States Patent [19]
Wise

[11] Patent Number: 5,424,922
[45] Date of Patent: Jun. 13, 1995

[54] FIBER OPTIC APPAREL AND SAFETY GEAR

[76] Inventor: John S. Wise, El Matador Motel Apartments, #63, Marina, Calif. 93933

[21] Appl. No.: 151,127

[22] Filed: Nov. 12, 1993

[51] Int. Cl.6 .............................................. F21L 15/08
[52] U.S. Cl. ..................................... 362/32; 362/108; 362/252; 362/103
[58] Field of Search ................ 362/108, 105, 106, 32, 362/806, 812, 231, 103, 252, 103, 800; 2/94, 95

[56] References Cited

U.S. PATENT DOCUMENTS

| | | | |
|---|---|---|---|
| 3,811,684 | 5/1974 | Tredway, Sr. | 362/103 X |
| 4,234,907 | 11/1980 | Daniel | 362/103 X |
| 4,380,791 | 4/1983 | Nishizawa | 362/231 |
| 4,652,981 | 3/1987 | Glynn | 362/108 X |
| 4,667,274 | 5/1987 | Daniel | 362/106 |
| 4,727,603 | 3/1988 | Howard | 362/103 X |
| 4,875,144 | 10/1989 | Wainwright | 362/103 |
| 5,070,436 | 12/1991 | Alexander et al. | 362/108 |
| 5,086,378 | 2/1992 | Prince | 362/103 |
| 5,249,106 | 9/1993 | Barnes et al. | 362/108 |

Primary Examiner—Ira S. Lazarus
Assistant Examiner—Thomas M. Sember

[57] ABSTRACT

A new and improved fiber optic apparel and safety gear adapted to be worn by a user and illuminated at night for the safety of the wearer comprising, fiber optic apparel and safety gear adapted to be worn by a user and illuminated at night for the safety of the wearer comprising, a garment fabricated of a fabric from fibers forming interstices between the fibers of the fabric, a fiber optic bundle having a light input end and a light output end, the bundle being formed of a plurality of light transmitting strands with such strands being separated one from another at the light output end, the ends of the strands at the light output end extending into individual interstices of the fabric and coupled thereto to form a pattern, the light output end of the bundle being located at the front portion of the garment in an array, and a control box coupled with respect to the garment, the control box having a source of illumination for the fabric optic bundle and a power source for illuminating the illumination means and further including control means adapted to be utilized by the wearer to activate the illumination means to transmit light through the fabric optic bundle to the array of light output ends of the garment and to remove the power and eliminate the illumination of the fabric optic bundle.

1 Claim, 4 Drawing Sheets

FIBER OPTIC APPAREL AND SAFETY GEAR

BACKGROUND OF THE INVENTION

1. Field of the Invention

The present invention relates to fiber optic apparel and safety gear and more particularly pertains to the illumination of garments for the protection of the wearer.

2. Description of the Prior Art

The use of illuminated garments is known in the prior art. More specifically, garments heretofore devised and utilized for the purpose of illumination are known to consist basically of familiar, expected and obvious structural configurations, notwithstanding the myriad of designs encompassed by the crowded prior art which have been developed for the fulfillment of countless objectives and requirements.

The prior art shows various devices for illuminating apparel. By way of example, U.S. Pat. No. 3,561,394 to Pickens discloses an item of apparel with indicia formed in a pattern and of a material to be glow when illuminated by an exterior light source.

The use of bulbs for illuminating an item of apparel is disclosed in U.S. Pat. Nos. 4,164,008 to Miller; 4,709,307 to Branom; 4,328,533 to Paredes and 3,549,878 to Valley. The Miller disclosure relates to support of the bulbs in a pattern such as a circle. Branom configures his light bulb in a form of an advertising sign. Paredes employs his bulbs on a vest for safety purposes and combines his bulbs with luminous panels. Lastly, Valley employs bulbs of various colors for entertainment of the wearer or one watching the wearer move as, for example, dance.

In this respect, the fiber apparel and safety gear according to the present invention substantially departs from the conventional concepts and designs of the prior art., and in so doing provides an apparatus primarily developed for the purpose of protecting the wearer.

Therefore, it can be appreciated that there exists a continuing need for new and improved fiber optic apparel and safety gear. In this regard, the present invention substantially fulfills this need.

SUMMARY OF THE INVENTION

In view of the foregoing disadvantages inherent in the known types of illuminated garments now present in the prior art, the present invention provides an improved fiber optic apparel and safety gear. As such, the general purpose of the present invention, which will be described subsequently in greater detail, is to provide a new and improved fiber optic apparel and safety gear apparatus and method which has all the advantages of the prior art and none of the disadvantages.

To attain this, the present invention essentially comprises a new and improved fiber optic apparel and safety gear adapted to be worn by a user and illuminated at night for the safety of the wearer comprising, in combination, formed of a back section and associated front sections coupled over the shoulder and at the sides of a wearer and having a central vertical opening between the front sections, the vest being fabricated of a woven fabric from fibers forming interstices between the fibers of the fabric; a plurality of fiber optic bundles, each bundle having a light input end and a light output end, each bundle being formed of a plurality of light transmitting strands with such strands being separated one from another at the light output end, the ends of the strands at the light output end extending into individual interstices of the fabric and coupled thereto to form a pattern, the light output end of one of the bundles being located at one of the front portions of the vest in a circular array, a second fabric optic bundle having its light output ends coupled to the interstices of the vest at a second front panel in a circular array and a third bundle having its light output end coupled to the interstices of the vest at the back portion in a rectangular array; a control box coupled to the vest at the back portion thereof, the control box having a source of illumination for each fabric optic bundle and a common power source for illuminating each of the illumination means and further including control means adapted to be utilized by the wearer to activate the illumination means to transmit light through the fabric optic bundle to the array of light output ends of the vest and to remove the power and eliminate the illumination of the fabric optic bundle.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved fiber optic apparel and safety gear which has all the advantages of the prior art illuminated garments and none of the disadvantages.

It is another object of the present invention to provide a new and improved fiber optic apparel and safety gear which may be easily and efficiently manufactured and marketed.

It is a further object of the present invention to provide a new and improved fiber optic apparel and safety gear which is of a durable and reliable construction.

An even further object of the present invention is to provide a new and improved fiber optic apparel and safety gear which is susceptible of a low cost of manufacture with regard to both materials and labor, and which accordingly is then susceptible of low prices of sale to the consuming public, thereby making such fiber optic and safety gear economically available to the buying public.

Still yet another object of the present invention is to provide a new and improved fiber optic apparel and safety gear which provides in the apparatuses and methods of the prior art some of the advantages thereof, while simultaneously overcoming some of the disadvantages normally associated therewith.

Still another object of the present invention is to render the wearer of the subject apparel visible at night.

Yet another object of the present invention is to improve the safety of people at night.

Even still another object of the present invention is to provide a new and improved fiber optic apparel and safety gear adapted to be worn by a user and illuminated at night for the safety of the wearer comprising, fiber optic apparel and safety gear adapted to be worn by a user and illuminated at night for the safety of the wearer comprising, a garment fabricated of a fabric from fibers forming interstices between the fibers of the fabric, a fiber optic bundle having a light input end and a light output end, the bundle being formed of a plurality of light transmitting strands with such strands being separated one from another at the light output end, the ends of the strands at the light output end extending into individual interstices of the fabric and coupled thereto to form a pattern, the light output end of the bundle being located at the front portion of the garment in an array, and a control box coupled with respect to the garment, the control box having a source of illumination for the fabric optic bundle and a power source for illuminating the illumination means and further including control means adapted to be utilized by the wearer to activate the illumination means to transmit light through the fabric optic bundle to the array of light output ends of the garment and to remove the power and eliminate the illumination of the fabric optic bundle.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
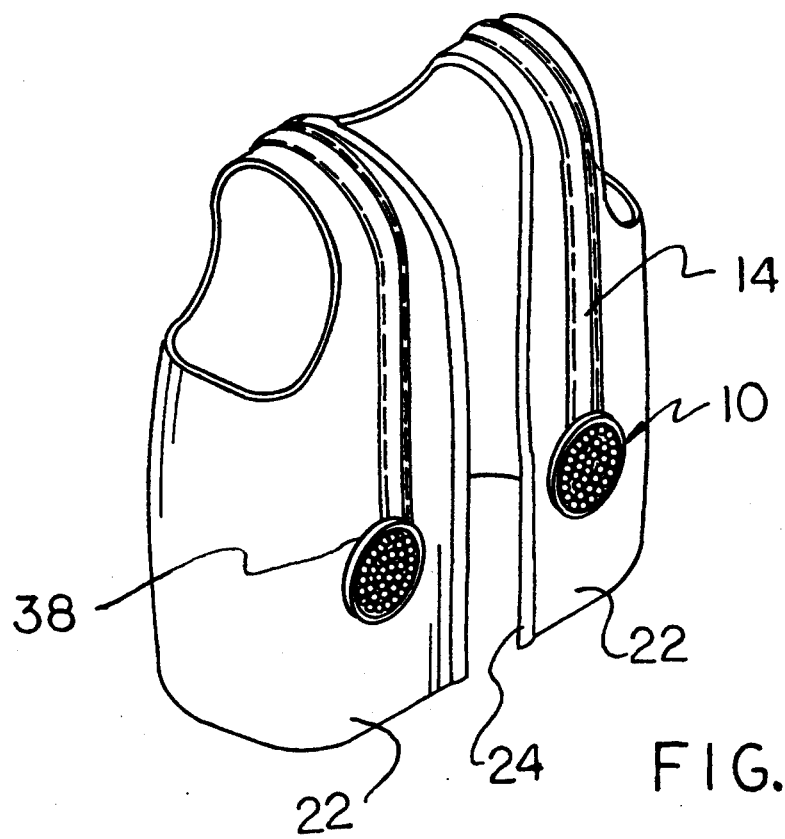
FIG. 1 is a perspective view of the front of a vest constructed in accordance with the principles of the present invention.
Figure 2:
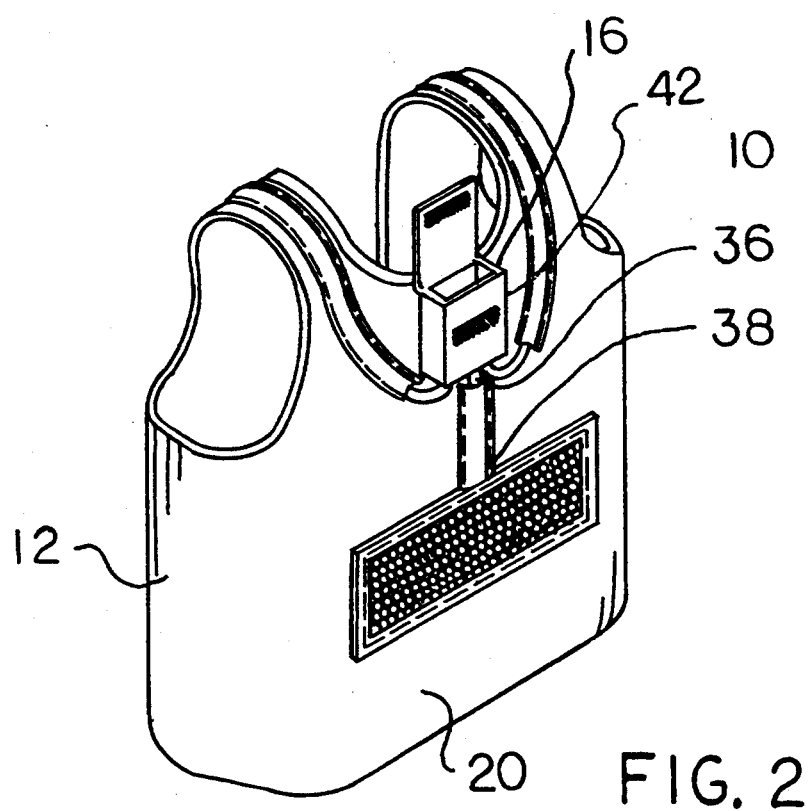
FIG. 2 is a back view of the vest as illustrated in FIG. 1.
Figure 3:
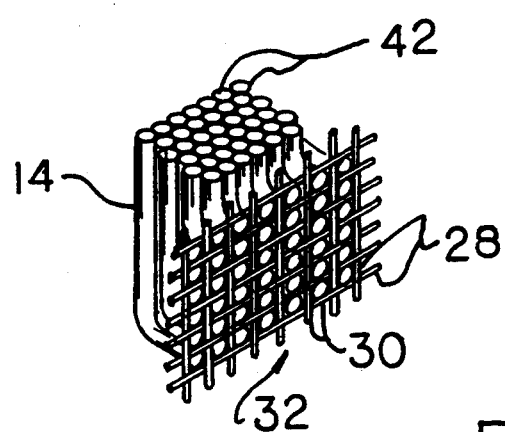
FIG. 3 is an enlarged perspective view of the coupling between the fabric fibers and fiber optic strands employed in the vest as shown in FIGS. 1 and 2.
Figure 4:
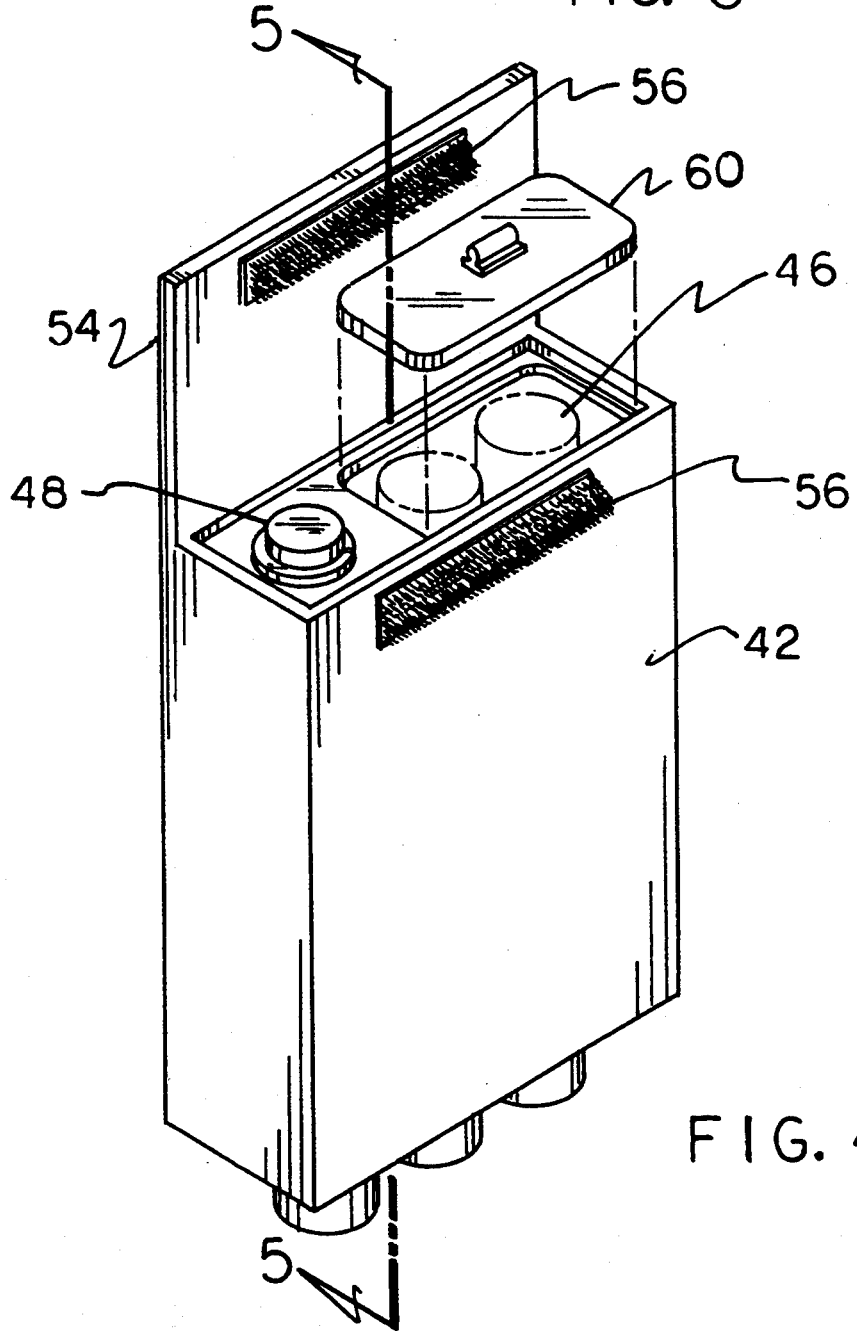
FIG. 4 is an enlarged view of the control panel for the fiber optic apparel and safety gear of the present invention as shown in FIGS. 1 and 2.

With reference now to the drawings, and in particular to FIG. 1 thereof, a new and improved fiber optic apparel and safety gear embodying the principles and concepts of the present invention and generally designated by the reference numeral 10 will be described.

More specifically, it will be noted in FIGS. 1 through 6 that there is shown a new and improved fiber optic apparel and safety gear which is adapted to be worn by a user and illuminated at night. Such arrangement is for the safety of the wearer. The apparel is a system 10 which comprises in its broadest of terms, a garment 12, fiber optic bundles 14 and a source of illumination 16.

In the preferred embodiment, the garment is a vest, 12. It is formed of a back section 20 and associated front sections 22 coupled over the shoulder and at the sides of a wearer. A central vertical opening 24 is formed between the front sections. The vest is preferably fabricated of a woven fabric from fibers forming interstices 28 between the fibers 30 of the fabric 32.

The second component of the system 10 is a plurality of fiber optic bundles 14. Each bundle 14 has a light input end 36 and a light output end 38. Each bundle 14 is formed of a plurality of light transmitting strands 42. Such strands 42 are separated one from another at the light output end 38.

The ends of the strands at the light output end extend into individual interstices of the fabric and are coupled thereto to form a pattern. The light output end of one of the bundles is located at one of the front portions of the vest in a circular array. A second fabric optic bundle has its light output ends coupled to the interstices of the vest at a second front panel also in a circular array. Note FIG. 1. A third bundle has its light output end coupled to the interstices of the vest at the back portion in a rectangular array. Note FIG. 2.

A control box 42 providing a source of illumination 16 is the third part of the system 10. It is coupled to the vest 12 at the upper back portion thereof. The control box 42 has a source of illumination, three bulbs 44, one for each fabric optic bundle. It also has a common power source 46 for illuminating each of the bulbs. Further included control means in the form of a switch 48 adapted to turn the bulbs off and on. The switch is utilized by the wearer to activate the illumination means to transmit light through the fabric optic bundle to the array of light output ends of the vest as well as to remove the power and eliminate the illumination of the fabric optic bundle. Appropriate wiring 52 couples the battery 46, switch 48 and bulbs 44 in a conventional manner.

The box 42 is a closed chamber for containing the control components. It has a lid 54 with securement components 56 as of a pile type fastener for opening and closing the chamber as for repair or replacement of parts and includes a lid 60 for changing of the batteries.

Figure 5:
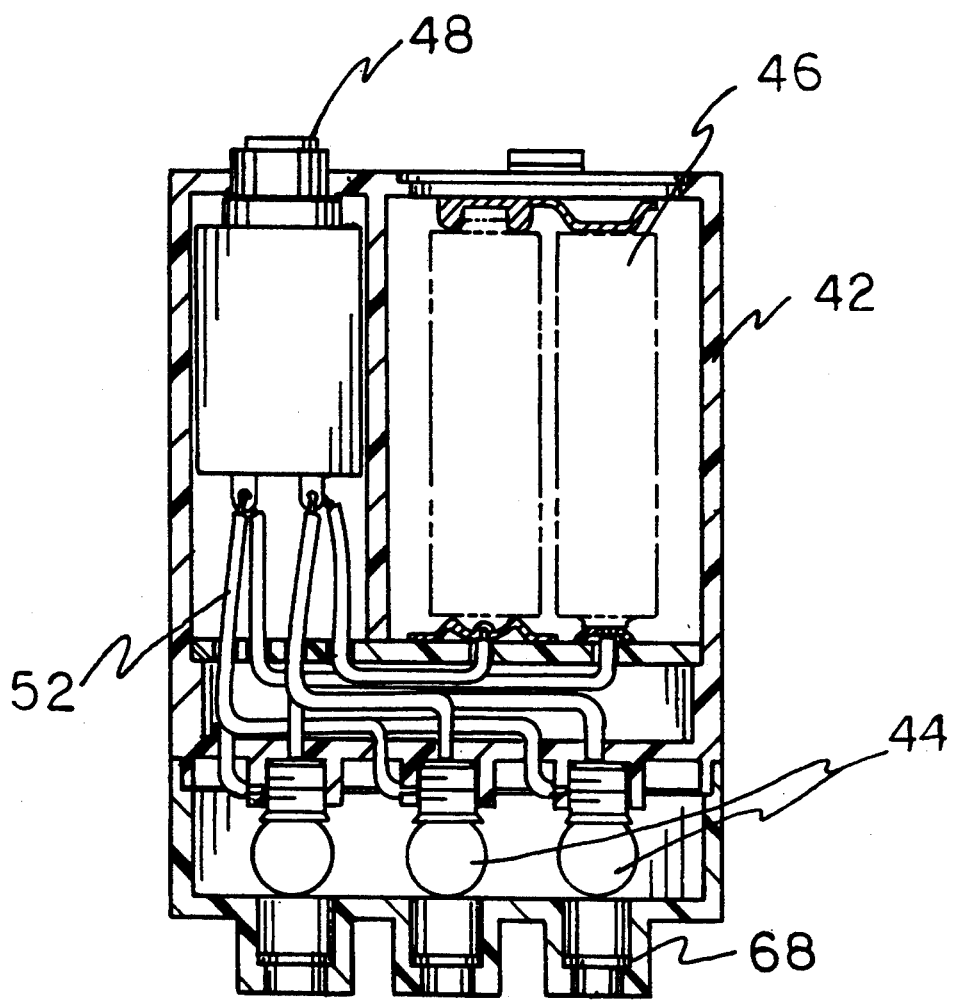
FIG. 5 is a sectional view taken along line 5—5 of FIG. 4.
Figure 6:
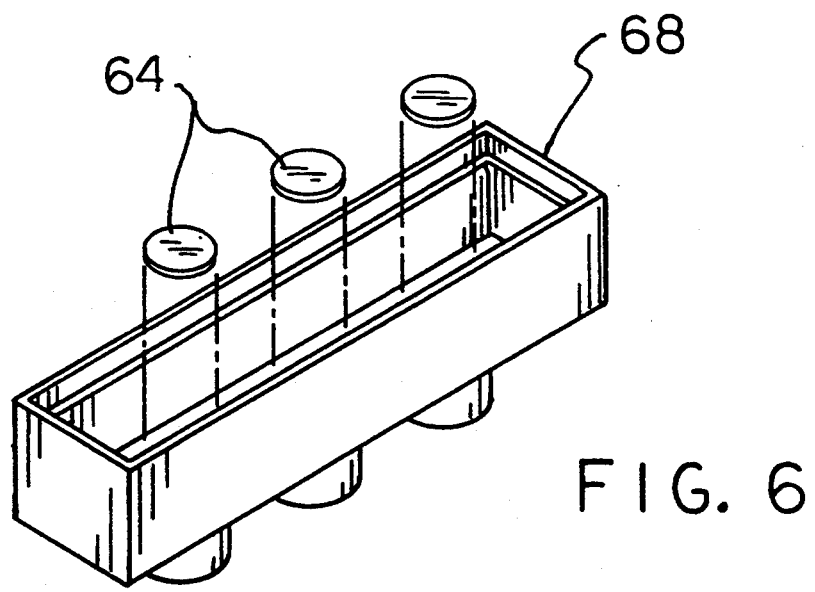
FIG. 6 is an enlarged perspective view in an exploded fashion showing a portion of the control panel of FIG. 1.

An alternate embodiment of the invention is shown in FIGS. 5 and 6. Such alternate embodiment is similar to that of the prior embodiment but further includes a colored filter 64 for each of the bulbs 44. The filters 64 are located between the illumination bulbs and the input end of each fiber optics bundle 14. Each fabric optic bundle is thereby illuminated at its output ends at the garment with each fabric optic bundle appearing in a predetermined color as determined by the color of the filter. A snap on extension 66 is located at the end of the box 42 adjacent to the bulbs 44 to secure the filters 64 in a proper position for use. Cylindrical barrels 68 have upper ends to selectively receive predetermined filters. The barrels have lower ends to receive the input ends of the fiber optic bundles.

Figure 7:
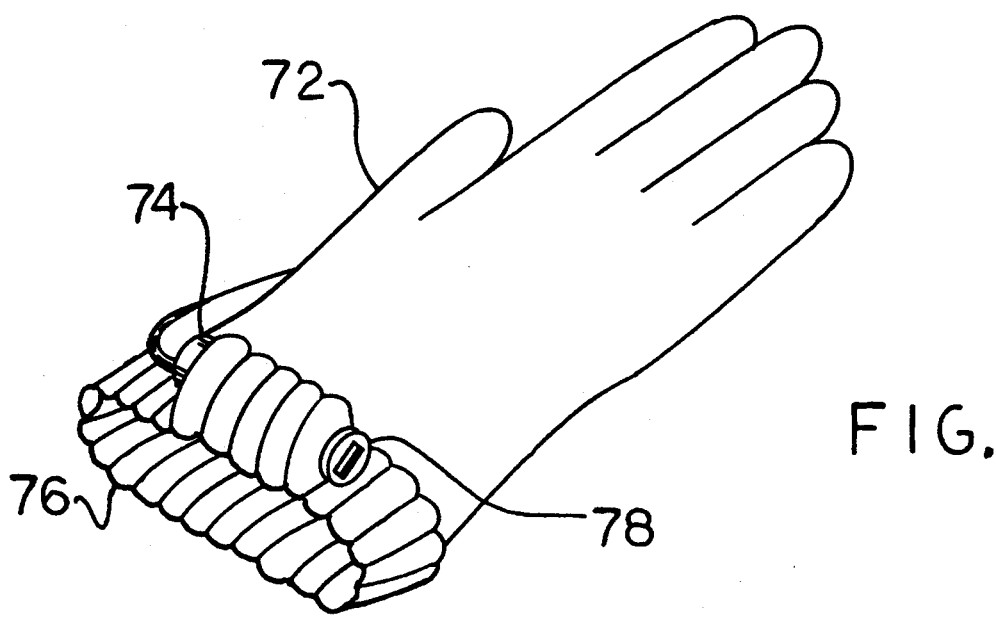
FIG. 7 is a perspective view of a glove constructed in accordance with the principles of the present invention and constituting an alternate embodiment of the invention.
Figure 8:
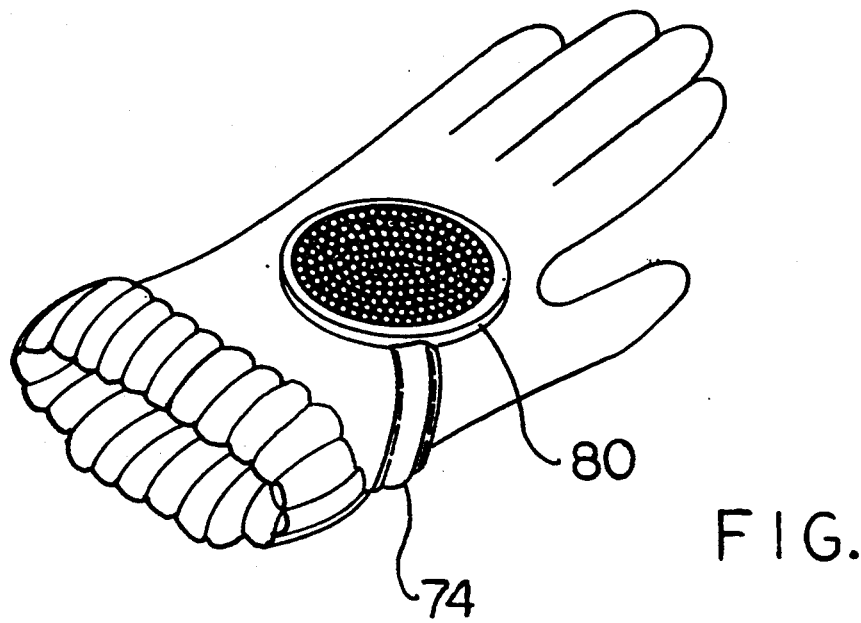
FIG. 8 is a perspective view of the glove shown in FIG. 7 but illustrating the opposite or rear side thereof.

An alternate embodiment of the invention is shown in FIGS. 7 and 8. In such embodiment, the garment is a glove 72. The fiber optics bundle 74 is short to couple the source of illumination 76 and controls 78 at the cuff of the glove to the output end of the fiber optics bundle on the back of a wearer's hand. In such embodiment the output and is in an array to form a circle 80.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved fiber optic apparel and safety gear adapted to be worn by a user and illuminated at night for the safety gear adapted to be worn by a user and illuminated at night for the safety of the wearer having a front and a back comprising, in combination:

a vest formed of a back section positionable over the back of a wearer and associated front section positionable over the front of a wearer and having a central vertical opening between the front sections, the vest being fabricated of a woven fabric from fibers forming interstices between the fibers of the fabric;

a plurality of fiber optic bundles, each bundle having a light input end and a light output end, each bundle being formed of a plurality of light transmitting strands with such strands being separated one from another at the light output end, the ends of the strands at the light output end extending into contiguous individual interstices of the fabric and coupled thereto to form a pattern of an individual color for each bundle, the light output end of one of the bundles being coupled solely at one of the front sections of the vest in a first discrete array of a first pattern, a second fiber optic bundle having its light output ends coupled solely to the interstices of the vest at a second front section in a second discrete array in a second pattern and a third bundle having its light output end coupled solely to the interstices of the vest at a central region of the back section in a third discrete array in a third pattern different from the first and second patterns;

a control box coupled to the vest at the back section thereof, the control box having an individual source of illumination and replaceable color filter for each fiber optic bundle and a common power source for illuminating all the sources of illumination and further including control means adapted to be utilized by the wearer to activate the power source to continuously transmit light through the fiber optic bundles to the array of light output ends of the vest and to remove the power and eliminate the illumination of the fiber optic bundles.

* * * * *